Nov. 21, 1933.  W. G. G. BENWAY  1,935,932
TELEPHONIC DEVICE FOR ASSISTING OR ENABLING
PARTIALLY DEAF PERSONS TO HEAR
Filed March 1, 1932  2 Sheets-Sheet 1
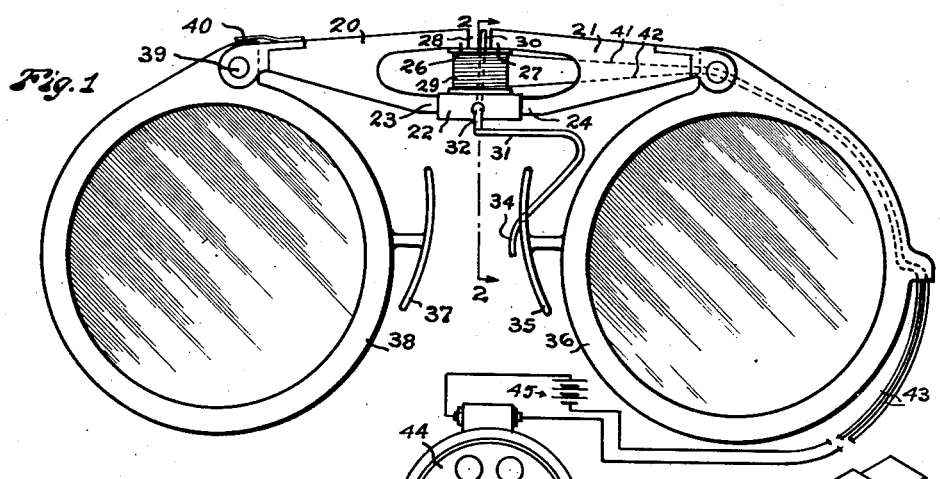
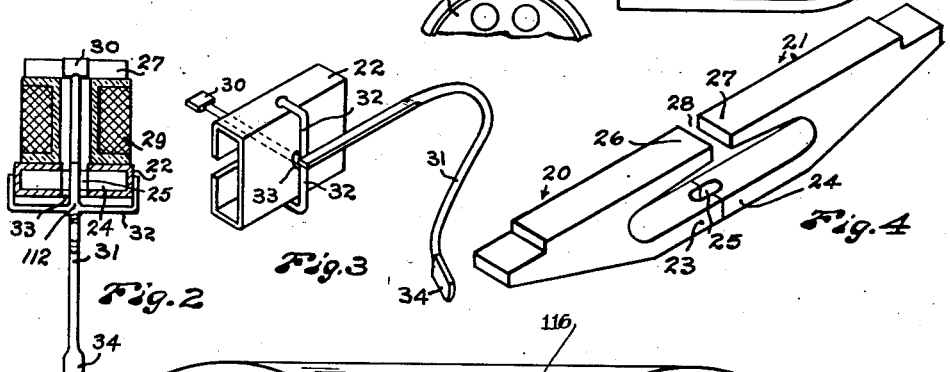
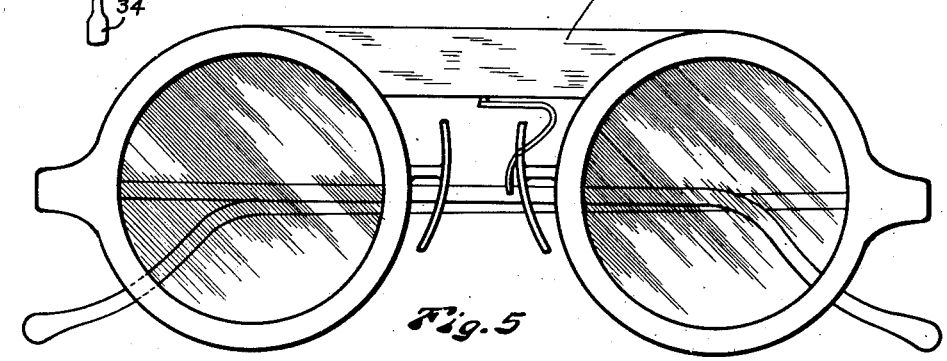
INVENTOR
William G. G. Benway
BY
G. Wright Arnold
ATTORNEY

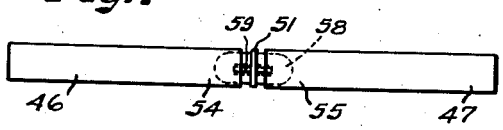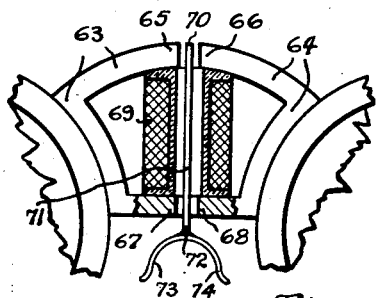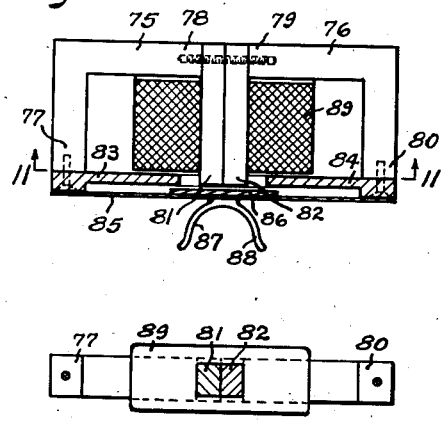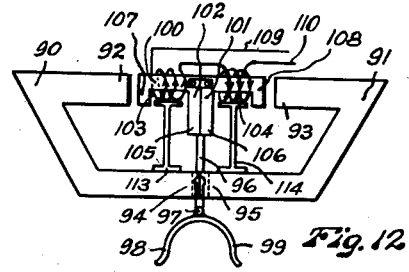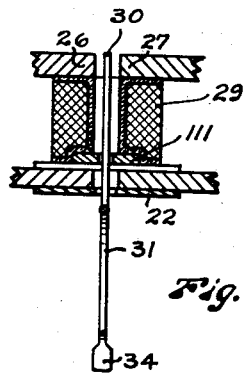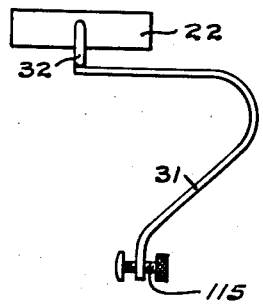

Patented Nov. 21, 1933

1,935,932

UNITED STATES PATENT OFFICE 1,935,932

TELEPHONIC DEVICE FOR ASSISTING OR ENABLING PARTIALLY DEAF PERSONS TO HEAR

William G. G. Benway, New York, N. Y.

Application March 1, 1932. Serial No. 596,063

13 Claims. (Cl. 179—107)

My invention relates to telephonic devices for assisting or enabling partially deaf persons, or persons whose hearing is impaired, to hear, such devices being commonly known as audiophones. More particularly, my invention relates to an improvement of the device disclosed in my application for Audiophone, filed January 26, 1931, Ser. No. 511,329.

The invention enables those partially deaf to hear through bone conduction by means of an electro-magnetic vibrating mechanism rendered inconspicuous by being associated with, built in, mounted on, or attached to the frame of a pair of spectacles, or device of whatsoever character, to be held before the eyes.

Those afflicted with partial deafness are peculiarly sensitive and rather than wear devices which have heretofore enabled them to hear, but which are readily recognizable as aids to hearing, many dispense with the same to avoid all possible embarrassment. The primary object of my invention is to provide a hearing mechanism associated with a seeing device or any device of whatsoever character to be held, or worn before the eyes as a means of concealing or rendering the said mechanism exceedingly inconspicuous.

The special form of the invention to be covered in this application is that wherein the vibratory mechanism is constructed as the nose bridge member of a spectacle or eyeglass frame or similar device. If bone conduction is to be established; the impulses against the nasal bones, provided by the electromagnetic mechanism in correspondence with the sound being reproduced, must be of a certain magnitude to be effective. To provide such mechanism of the required vibrating power or strength and at the same time of such small size and form and lightness of weight as to permit disposing them inconspicuously in the nose bridge is one of the primary objects of this invention.

While the magnitude of the impulse must be sufficiently great to produce the required degree of bone conduction, nevertheless, the mounting of the electro-magnetic vibrating means upon the nose bridge, or its attachment to, or its incorporating in the nose bridge, must be of a character so that the lens of the spectacles will not be set in vibration to an extent which will be objectionable.

This magnitude of the impulse to be effective to produce bone conduction varies with different people, since the bone conductivity is individual with each person. Accordingly, the vibratory member must be of a form which will permit of its being readily adjusted to the user, and then be of a relatively permanent character. This adjustment is important. Furthermore, the movement of the head must not interfere with this adjustment when made, and ordinary movements of the body, such as walking, must not jar the adjustment of the armature part of the vibratory mechanism.

The objects or purposes of my invention are to provide an audiphone of the character described which fulfills and meets all of the above requirements.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1 is a view in front elevation of the frame of a pair of spectacles embodying my invention.

Fig. 2 is a view in cross section on dotted line 2, 2 of Fig. 1.

Fig. 3 is a view in perspective of the magnet-connecting clip or bracket with vibrator, torsion and armature members mounted thereon.

Fig. 4 is a view in perspective of the permanent magnets.

Fig. 5 represents spectacle frame (with bows) having a tortoise shell or other material case to enclose the permanent magnets in the nose bridge member.

Fig. 6 is a view in perspective of the upper part of a pair of spectacles showing a modified form of the permanent magnets and electro-magnetic coil.

Fig. 7 is a plan view of said modified form.

Fig. 8 is a detailed view of the preferred form of armature of said modified form.

Fig. 9 is a view in front elevation with parts in section of a second modified form of the permanent magnets and electro-magnetic coil.

Fig. 10 is a sectional view in elevation of a third modified form.

Fig. 11 is a view on dotted line 11, 11 of Fig. 10.

Fig. 12 is a view in elevation of a fourth modified form of the permanent magnets and electro-magnetic coils.

Fig. 13 represents a means of adjustment for each individual nose.

Fig. 14 is a sectional view of a fifth modified form.

Two permanent magnets 20 and 21 in Fig. 1, having their unlike poles in mutual attraction position and having the lowermost poles in contacting relation, are united at their bottom portions by means of a connecting member or clip 22, (turned on edge in Fig. 3). The pole members 23 and 24 slip into connecting member or clip 22 and are firmly held in contact with each other. Opening 25 is formed by cutting small notches, which may be semi-circular in cross-section, out of each of the poles 23 and 24. The upper poles 26 and 27 are cut away to form the gap 28. Electro-magnetic coil 29 is placed between the end portions of the pole members as shown in Fig. 1. An armature 30 formed of very magnetically permeable material which may be "Hypernick" is provided of a length to extend from the top of the pole members 26 and 27 to the bottom of the electro-magnetic coil 29. This armature is joined at the point 112 to a vibrating member 31. Extending transversely of the magnets may be disposed a torsion member 32, best shown in Figs. 2 and 3. This torsion member 32 is preferably cylindrical in form and caused to extend at right angles of the permanent magnets, because it was found that when the torsion member was in the form of a band and caused to extend longitudinally of the magnets, that the said torsion member seemed to have nodes of vibration of its own and seriously interfered with the tone properties produced. This member has mounted thereon the vibrating member 31 which passes through the clip in opening 33, which registers with opening 25 in the magnets and permits the armature 30 to extend axially through the coil 29. Vibratory member 31 has a nose contacting portion 34. This nose contacting portion 34 extends through one of the nose embracing members 35 mounted on the lens frame 36. (Fig. 1.) The other nose embracing member 37 may or may not have any vibrating member extending therethrough. Lens frame 38 may be pivotally mounted at 39 upon magnet 20 and be resiliently held against the nose by means of spring 40. The ends of the wires 41 and 42 may lead through, or outside of one of the lens frame members either 36 or 38 and then out through a ribbon 43 which ribbon serves to conceal the said wires. The wires 41 and 42 lead to the microphone 44 and the battery 45 which are carried in a suitable pocket means.

In Figs. 6, 7 and 8, a modified form of the invention is shown wherein magnets 46 and 47 have the lens frames 48 and 49 mounted thereon. The permanent magnets 46 and 47 having their unlike poles in mutual attraction position and having the lowermost poles in contacting relation. The permanent magnets will be held together by a connecting member of magnetic or non-magnetic material, preferably non-magnetic, in the form of a band 50, with an opening therethrough to permit the band form armature to extend therethrough. The ends of the magnets 52 and 53 having an opening therein corresponding to opening 25 in magnets 20 and 21. The ends 54 and 55 of magnets 46 and 47 preferably have a portion cut away at 56 and 57 to permit the insertion of the electro-magnetic coil 58. The band armature 51 preferably has the middle portion 59 turned at right angles to the upper portion which is disposed between the ends of poles 54 and 55. This portion 59 thus rises in the plane of the magnets and permits the coil to be of oval form so that it affords a larger number of windings without extending beyond the side walls of the magnets 46 and 47. A torsion member 60 is provided similar to torsion member 32 as the means for mounting the vibratory member 61, having the nose engaging portion 62.

In the modified form shown in Fig. 9, the permanent magnets 63 and 64 have their unlike portions 65 and 66, 67 and 68 disposed in mutual attraction position and poles 67 and 68 preferably in contacting relation. An electro-magnetic coil 69 is mounted between the end portions of said magnets. An armature 70 is axially mounted through said coil as indicated by 71 and is connected to a vibrating member 72. The form of vibratory member shown is of the forked character having branches 73 and 74 embracing both sides of the nose. This form of the nose bridge member may have the open spaces on each side of the coil left uncovered, the coil of course being covered to conceal its true character. The particular advantage of this form of the bridge member is the substantial distance between the poles of the permanent magnets along armature 70, thereby permitting the electromagnetic coil 69 to comprise a large number of turns or windings.

In the modified form of Figs. 10 and 11 permanent magnets 75 and 76, having pole members 77, 78, 79 and 80 are bound tightly together by means of pole pieces of highly magnetic permeable material, 83 and 84. The center pole consists of two pieces of highly magnetic permeable material 81 and 82. Poles 77 and 80 of like magnetic polarity are in mechanical contact with pole pieces 83 and 84. Diaphragm 85 of non-magnetic material is supported by pole pieces 83 and 84. On member 85 is soldered a piece of highly magnetic permeable armature 86 in direct opposition to pole ends, 81 and 82. Vibratory members 87 and 88 are mounted on strip or member 85. About members 81 and 82 electro-magnetic coil 89 is located.

The particular advantage of this form of the invention is that it provides for localizing the magnetic flux by means of the members 81, 82, 83, 84 and 86.

In the modified form shown in Fig. 12, permanent magnets 90 and 91, having their unlike poles 92, 93, 94 and 95 disposed as shown in Fig. 12 with poles 94 and 95 being in contacting relation. Through the later pole members an opening is provided for the admission of vibratory member 96, which vibratory member 96 is mounted on a torsion member 97 similar to the form shown in Fig. 1, the vibrating member being provided with forks or branches 98 and 99 to embrace both sides of the nose. Upon the vibratory member 96, which is of magnetic material are mounted armatures 100 and 101 joined together by strap 102 or any other desirable manner. Electro-magnetic coil 103 is mounted by means of a bracket 113 mounted on permanent magnet 90 and coil 104, similarly mounted on a bracket 114 mounted on magnet 93. The wiring of these two coils are continuous and provide conductors 109 and 110, windings of core 104 being oppositely directed to that of coil 103, whereby the pole members 105 and 106 are of like magnetic sign, as well as are poles 107 and 108.

In Fig. 14, a modified form of Fig. 1 is shown wherein member 111 of non-magnetic material is mounted on top of connecting member 22. This member 111 securely embraces vibratory member 31 just below the armature 30, so that the armature 30 maintained at all times axially disposed in the axis of the coil and equally distant between the pole ends 26 and 27. In this construction, when the nose engaging portions 34 of the vibratory member 31 is pressed in contact with the nose, the displacement is confined in that portion of the vibratory member extending between the torsion member 32 and the nose engaging portion 34 of the vibratory member and eliminates all question of adjustment. In Fig. 13 a set-screw 115 shown mounted in the vibratory member 31 with a nose engaging portion mounted on the end of said set-screw. This construction provides for a nicety of adjustment of the armature member 30.

The mode of operation of the device embodying my invention as shown in Figs. 1, 2, 3 and 4 is as follows:

When the spectacles are applied to the nose, the spring 40 permits lens frame 38 to open so that the spectacles may be applied to the nose. Then, when the lens frame 38 is released, the spring causes the nose clasping member 37 to press against the nose. In doing this the nose contacting portion 34 of the vibratory member 31 is forced back into the plane of the nose clasping member 35 and this in turn adjusts the armature 30 to swing to the center of the opening or gap 28. Then as a current energizes the coil 29 in response to the microphone action, the polarity of the armature 30 is alternately changed from a north to a south pole and accordingly will receive a push and a pull from the pole members 26 and 27 so that the armature will be caused to vibrate. This vibration of the armature 30 is transmitted to the vibrating member 31 and this in turn is directly transmitted to the nose contacting portion at 34, which bears upon the nasal bone and causes bone conduction to the auditory system or organs, all of which has been established by testing on numerous people.

The opaque non-metallic frame of tortoise shell or other material shown in Fig. 5, may be employed to encase the magnets so that their construction will not be apparent. By the devices herein shown, one who is partially deaf is enabled to hear without having the embarrassment of employing a conspicuous device, or without the annoyance of an ear horn or any such prominent instrument which reveals at once the hearing infirmity. The adjustment of the vibrating member to cause the armature member to assume an axial position in the coil 29 is important and is provided by the structure illustrated. Furthermore, it is manifest that the movement of the head does not interfere with this adjustment, nor do other ordinary movements of the body such as walking, result in disturbing the adjustment of the armature 30. The torsion member 32 functions to maintain the armature 30 axially positioned with respect to the adjacent pole members. The mounting of the vibrating member in connection with the magnets has the function of causing the weight of these members to absorb the vibration so that the same is not transmitted to the lens frames 36 and 38 to any objectionable extent.

The device embodying the invention herein disclosed has been constructed and operated and found to repeatedly give the results stated and has been found highly satisfactory in achieving the objects and purposes herein specified.

Obviously, changes may be made in the forms, dimensions and arrangement of the parts of my invention, without departing from the principle thereof, the above setting forth only preferred forms of embodiment. Obviously, the lens frame members may be mounted upon the case 116 rather than upon the magnets. Wherever the term "spectacles" is employed herein it is to be understood as including seeing devices designed to be held before the eyes, including pince-nez form of eye glasses or spectacles with bow frames or lorgnettes, or any other character of seeing devices. The term "frame" is to be understood as including lens frame, nose bridge frame member or any one of these parts, according to the context.

The angular relation of vibrating member 31 to the armature 30 as well as its degree of resiliency, assists in aiding the adjustment of the armature 30 so it will assume the axial position in those forms of the device illustrated where it is not held to the axial position. Also, be it noted the pressure of the vibratory member in bearing against the nose functions to hold the spectacles firmly on the nose and to minimize the tendency to create objectionable vibration of the lens due to the armature vibrating.

I claim:

1. In a device of the character described a spectacle frame to be worn before the eyes, having a nose bridge embodying two magnets with unlike poles disposed in mutual attraction position; an electro-magnetic coil mounted between the said magnets; an armature axially mounted in said coil; and a vibrating member secured to said armature, said vibrating member having a nose contacting portion.

2. In a device of the character described a spectacle frame to be worn before the eyes, having a nose bridge embodying two permanent magnets with unlike poles disposed in mutual attraction position; an electric-magnetic coil mounted between said magnets; a torsion member; an armature mounted axially in said coil on said torsion member; and a vibrating member fixedly secured to said torsion member and having a nose contacting portion.

3. In a device of the character described, a spectacle frame to be held before the eyes, a nose bridge for said frame embodying two magnets with unlike poles disposed in mutual attraction position; an electro-magnetic coil mounted between the said magnets; an armature axially mounted in said coil; nose embracing members mounted on the lens part of said frame; a vibrating member fixedly secured to said armature, said vibrating member extending through one of said nose embracing members; and a nose contacting portion secured to the end portion of said vibrating member extending through said nose embracing member.

4. In a device of the character described a spectacle frame to be worn before the eyes, having a nose bridge, magnets in said nose bridge; an electro-magnetic coil mounted between the said magnets; an armature axially mounted in said coil; and a vibrating member fixedly secured to said armature, said vibrating member having a nose contacting portion.

5. In a device of the character described, an electro-magnetic vibratory assembly comprising magnets having their respective poles positioned in proximity and in opposed relation to each other, a pole piece contacting at one end with the members of one pair of said poles and extending at its free end into proximity to but out of contact with the other pair of said poles, a coil surrounding said pole piece, an armature mechanically independent of said coil and disposed in operative relation to the free end of said pole piece and the adjacent magnet poles, a bone contact member connected to said armature, and means to support said assembly upon a person's head and in position for the contact members to bear against a bone of the head.

6. In a device of the character described, an electro-magnetic vibratory assembly comprising magnets having their poles positioned in proximity and respectively opposite to each other, a pole piece disposed between and contacting at one end with one pair of said oppositely disposed poles and extending at its free end into proximity but out of contact with the other pair of said poles, means to vary the flux in the magnetic circuit of said magnets by and in accordance with sound waves, an armature mechanically independent of said flux varying means disposed in operative relation to be vibratorily influenced by variations of the magnetic flux, and a bone contact member connected to said armature.

7. In a device of the character described, an electro-magnetic vibratory assembly comprising magnets having their like poles positioned in proximity and in opposed relation to each other, a pole piece disposed between and contacting at one end with one pair of said oppositely disposed poles, and extending at its free end into proximity but out of contact with the other pair of said poles, means to vary the flux in the magnetic circuit of said magnets by and in accordance with sound waves, an armature mechanically independent of said flux varying means and disposed in operative relation to be vibratorily influenced by variations of the magnetic flux, a bone contact member connected to said armature, and means to support said assembly upon a person's head and in position for said contact member to bear against a bone of the head.

8. In a device of the character described, an electro-magnetic vibratory assembly including a magnet, a pole piece contacting with one of the poles of said magnet and having its other end disposed in proximity to but out of contact with the other pole of the magnet, means to vary the flux in the magnetic circuit of said magnet and pole piece by and in accordance with sound waves, an armature mechanically independent of said flux varying means arranged to be vibrated in accordance with the variations in the magnetic flux, a bone contacting member connected to vibrate with said armature, and means to support said assembly upon the head of a person and in position for said contact member to bear against a bone of the head.

9. In a device of the character described, an electro-magnetic vibratory assembly comprising a pair of magnets oppositely disposed with their poles presenting towards each other, pole pieces interposed between said magnets and secured together, said pole pieces at one end, respectively, contacting against the end faces of one pair of opposed magnet poles, the other ends of said pole pieces extending between but out of contact with the faces of the other pair of opposed magnet poles, a coil carried by and surrounding said pole pieces, a vibratory armature disposed in operative relation with respect to the free ends of said pole pieces and their adjacent magnet poles to be vibrated by variations in the magnetic field thereof, and a bone contact member connected to said armature to be vibrated therewith.

10. In a device of the character described, a spectacle frame to be worn before the eyes having a nose bridge embodying two permanent magnets with unlike poles disposed in mutual attraction position; a connecting member to secure together the members of one pair of the poles of the opposed magnet poles, the other pair of said magnet poles having a space between them; an electro-magnetic coil mounted between said magnets; an armature axially mounted in said coil and having a portion thereof disposed in the space between said spaced magnet poles; and a vibrating member secured to said armature, said vibrating member having a nose contacting portion.

11. In a device of the character described, a spectacle frame to be worn before the eyes having a nose bridge embodying two permanent magnets with unlike poles disposed in mutual attraction position; a connecting member to secure together the members of one pair of the poles of the opposed magnet poles, the other pair of said magnet poles having a space between them; a torsion member mounted on said connecting member, said torsion member being disposed in a plane of the axis of the coil and at right angles to the plane of the magnets; an armature disposed axially in said coil and mounted on said torsion member and having a portion thereof disposed in the space between said spaced magnet poles; and a vibrating member fixedly secured to said armature and having a nose contacting portion.

12. In a device of the character described, a spectacle frame to be worn before the eyes and having a nose bridge embodying two permanent magnets with unlike poles disposed in mutual attraction position; a connecting member to secure together the members of one pair of the poles of the opposed magnet poles, the other pair of said magnet poles having a space between them; a torsion member; an armature disposed axially in said coil and mounted on said torsion member and having a portion thereof disposed in the space between said spaced magnet poles; and a vibrating member fixedly secured to said armature and having a nose contacting portion.

13. In a device of the character described, an electromagnetic vibratory assembly comprising a pair of magnets having their poles presenting towards each other, one pair of said opposed poles having a space between them, means controlled by sound vibrations to vary the magnetic field in said space; a freely vibratory armature mechanically independent of the magnetic field varying means, and mounted to be movable longitudinally of one pair of said pole pieces, said armature being arranged to be influenced by said magnetic field; a bone contact member connected to said armature; and a support for said assembly, said support adapted to be carried by the head of a person and operating to maintain the contact member in bearing contact against a bone of the head.

WILLIAM G. G. BENWAY.